Oct. 28, 1947.                H. W. BOTELER                2,429,602
                                 VALVE
                        Filed July 27, 1944           2 Sheets-Sheet 1
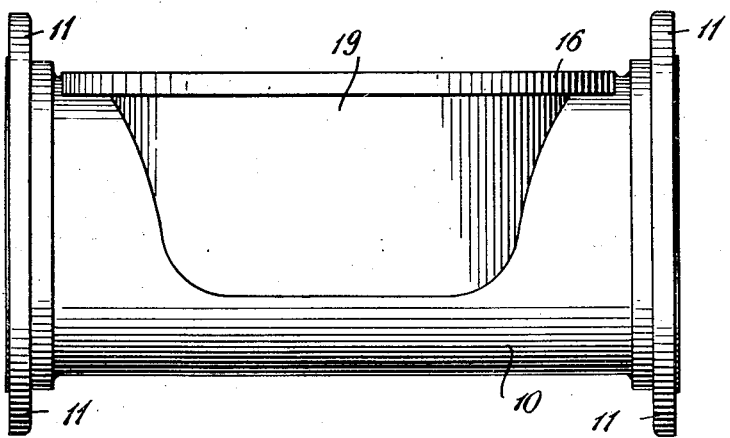
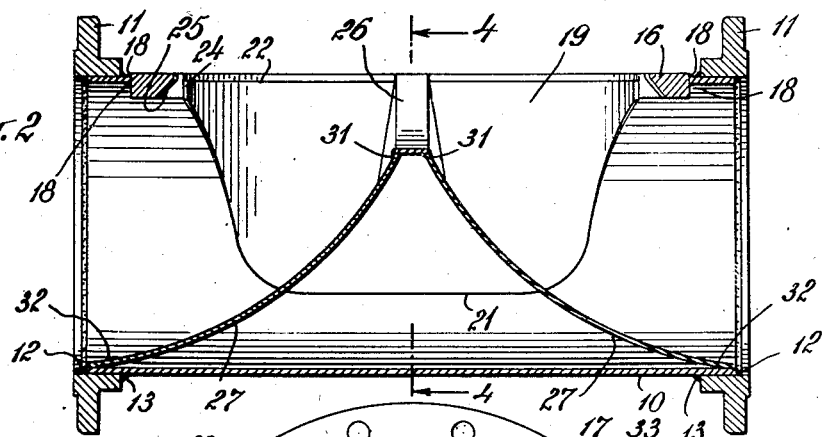
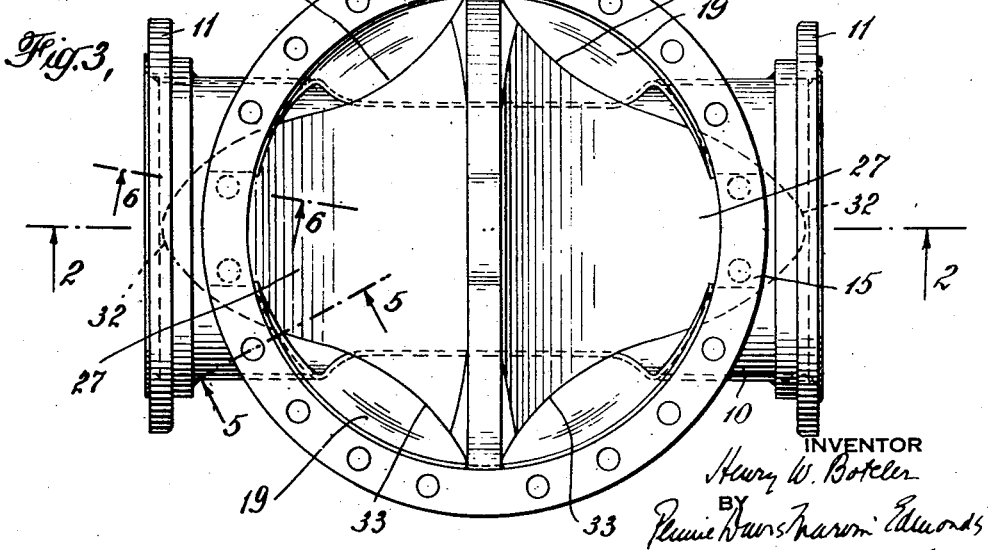
INVENTOR
Henry W. Boteler
BY
ATTORNEYS Oct. 28, 1947.　　　H. W. BOTELER　　　2,429,602
VALVE
Filed July 27, 1944　　　2 Sheets-Sheet 2
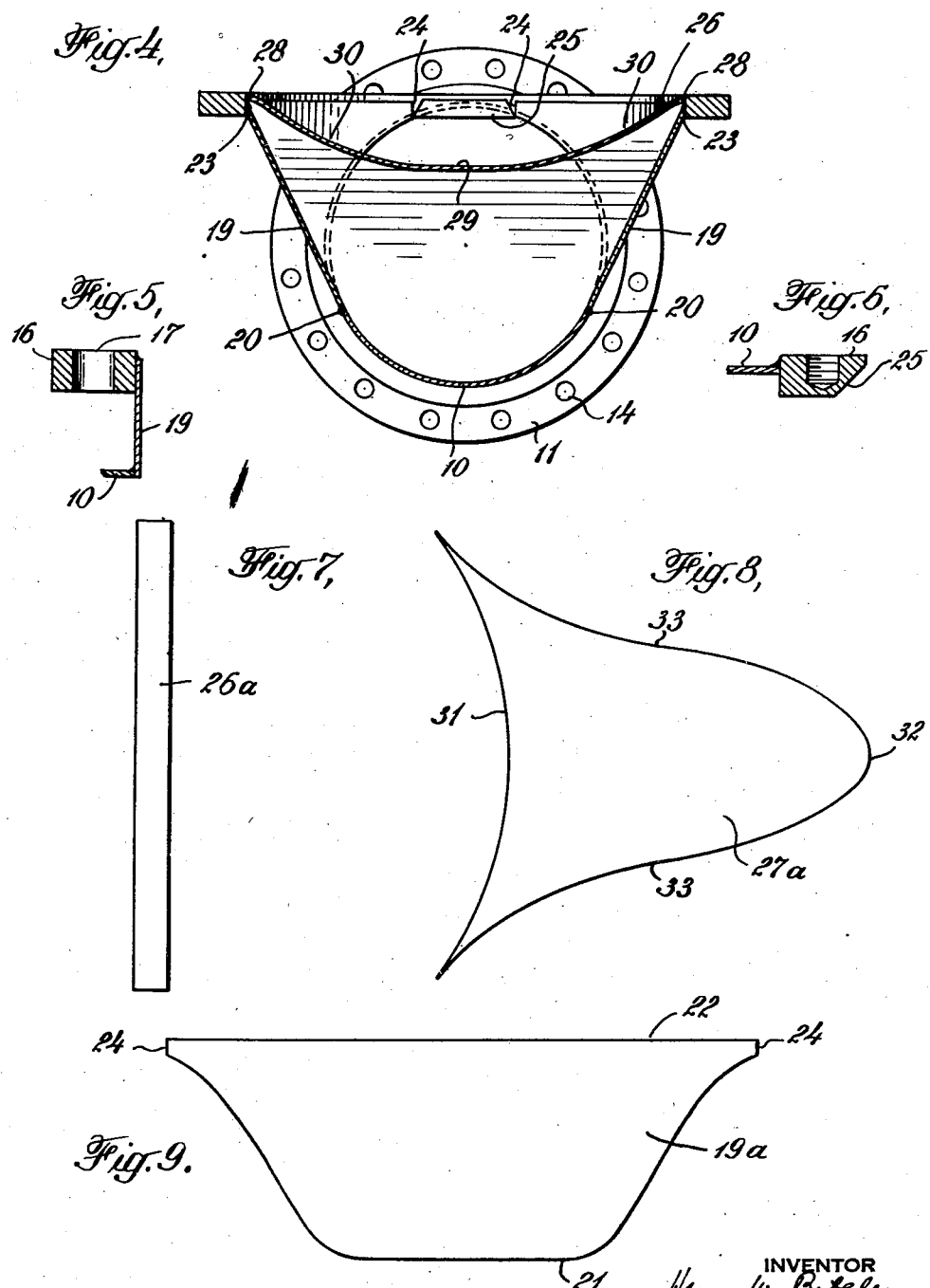

Patented Oct. 28, 1947

2,429,602

UNITED STATES PATENT OFFICE 2,429,602

VALVE

Henry W. Boteler, Larchmont, N. Y., assignor, by mesne assignments, to Grinnell Corporation, Providence, R. I., a corporation of Delaware Application July 27, 1944, Serial No. 546,758

5 Claims. (Cl. 29—157.1)

1

This invention relates to diaphragm valves which comprise a body having a passage or bore intersected by a shallow weir having a seat at its top, and a flexible diaphragm which is moved to and from the seat to control the flow of fluid through the valve. More particularly, the invention is concerned with a novel body for such diaphragm valves, which is lighter in weight and less expensive to manufacture than diaphragm valve bodies as made heretofore.

In diaphragm valves of the Saunders type, shown, for example, in Saunders Patents Re. 19,151 and 1,855,991, the valve body includes a hollow barrel section provided with means, such as flanges, at its ends by which the valve can be connected in the line. A passage or bore extends through the body from end to end and the bore is intersected by a shallow weir between the ends of the body. Above the weir, the body has an opening across which the diaphragm is mounted and the mechanism for actuating the diaphragm is contained in a bonnet which is attached to the body at the edge of the opening in such fashion as to clamp the edge of the diaphragm between the end of the body and the edge of the opening. In order to decrease the restriction to flow offered by the weir, the width of the body in alignment with the weir is greater than the diameter of the bore at its ends.

The bodies of such valves have heretofore been made by casting and, since the structure is of some complexity, the casting operation presents considerable difficulty. Also the valve body so made as a single casting is of considerable weight, and because of its method of manufacture and weight, the cost of such a valve body is a substantial part of the cost of the complete valve.

The present invention is, accordingly, directed to the provision of a diaphragm valve body of novel construction, which is lighter in weight than prior cast bodies and is less expensive to manufacture. The new valve body is made of a number of parts secured together by welding and many of the parts are made of flat metal stock bent to final form by rolling operations. All of the parts are so formed that they contain no areas in which the metal is distorted from its plane about more than one axis, so that the production of the parts does not require the use of forming dies, which are expensive.

For a better understanding of the invention, reference may be made to the accompanying drawing, in which Fig. 1 is a view of the new diaphragm valve body in side elevation;

2

Fig. 2 is a longitudinal sectional view on the line 2—2 of Fig. 3;

Fig. 3 is a plan view of the body;

Fig. 4 is a transverse sectional view on the line 4—4 of Fig. 2;

Figs. 5 and 6 are sectional views on the lines 5—5 and 6—6, respectively, of Fig. 3; and Figs. 7, 8, and 9 are plan views of parts of the valve body.

The new valve body comprises a barrel 10, which may be of different forms and in the construction shown is generally cylindrical. Such a cylindrical barrel may be made of a length of tubing, and barrels of other forms may be made in any appropriate manner. At its ends, the barrel extends into and is secured to flanges 11, as by welding, indicated at 12, 13. The flanges are used to connect the valve in a fluid line and are bored to provide bolt holes 14.

Between its ends, the wall of the barrel is cut away at the top and sides to provide a cut-out having opposite extensions 15 at the top in which may be seated a third flange 16. This flange serves as a means for securing the bonnet for the diaphragm actuating mechanism to the body and the edge of the flexible diaphragm (not shown) is ordinarily clamped between flange 16 and a corresponding flange on the bonnet by bolts passing through openings, such as those designated 17, in the flanges. The diaphragm to be used is made of flexible impervious material, such as a reinforced rubber sheet and it serves to close the opening through flange 16 and prevent the escape of fluid into the bonnet. Flange 16 is secured to the wall of the barrel in the cut-out extensions 15 at the top of the barrel by welding indicated at 18.

The flange 16 is of substantially greater internal diameter than the ends of the barrel and the lateral openings in the barrel below flange 16 are closed by side plates 19. These plates are formed of blanks shown in Fig. 9 and they are so shaped that they may be butt-welded to the edge of the cut-out in the barrel, as shown at 20. Each side plate is flat in section along its central transverse axis on the line 4—4 of Fig. 2 and the ends of the side plates are bent inward so that the lower edge 21 of each plate will have the same shape as the portion of the edge of the cut-out to which it is to be secured. The upper edge 22 of each side plate has the shape of the arc of a circle and it lies within the opening through flange 16 and is secured to the wall of the opening by welding 23. The ends 24 of the side plates terminate substantially flush with edges of the cut-out extensions 15 at the top of the barrel and between the spaced ends of the side plates, the inner wall of flange 16 may be undercut, as indicated at 25, to facilitate liquid flow.

The side plate blanks 19a are cut from flat sheet stock and the blanks are formed into side plates by bending operations. At no place in the finished side plate is the blank bent or distorted from its plane about more than one axis, so that the plates may be produced by rolling operations and without the use of expensive forming dies.

The weir within the valve body is formed of a weir seat plate 26 and two shovel plates 27. These plates are formed from blanks 26a, 27a, respectively, of flat metal stock and they have no areas in which the metal is distorted from its plane about more than one axis, so that their formation does not require the use of dies.

The weir seat plate 26 is mounted to extend across the opening in flange 16 transverse to the axis of the barrel and it is welded at its ends at 28 to the inner wall of the opening. Plate 26 is generally concave upwardly, and in the form shown, its central section 29 is flat and each end section 30 on either side of the central section is bent to form arcs of two different radii. The top of the plate forms the seat against which the diaphragm may contact to close the valve and this seat is illustrated as of uniform width from end to end. This shape is not essential, nor is the precise curvature of the seat that has been shown necessary.

Each shovel plate 27 is secured along its end edge 31 to an edge of the weir seat plate by welding and the shovel plates extend in opposite directions from the weir seat plate toward the ends of the barrel. In the valve body shown, the ends 32 of the shovel plates extend to the ends of the barrels. The lateral edges 33 of the shovel plates are welded to the inner surface of the barrel and also to the inner surfaces of the side plates 19. The upper surfaces of the shovel plates curve upwardly from the ends of the barrel to the weir seat plate and lead up to and from the weir seat. Transversely the shovel plates are straight in section.

As will be apparent from the foregoing, the portions of the new valve body, except for the flanges, are all made of relatively thin sheet metal and none of the parts requires formation by forming dies. The body is much lighter in weight than a cast body for a valve of the same size and the cost of manufacture is substantially less. At the same time, a valve which includes the new body is quite as satisfactory in performance as prior valves in which cast bodies are used.

I claim:

1. The method of producing a body for a valve of the diaphragm type which comprises forming a hollow barrel having a cut-out in one side between its ends and extending equally into both adjacent sides, forming from sheet material by distorting the material from its plane about but a single axis (1) a pair of side plates, (2) a curved weir seat plate, and (3) a pair of shovel plates of generally triangular form, and assembling the barrel and said other parts with three annular flanges to form a unitary diaphragm valve body structure with one of the annular flanges secured to each end of the barrel and the third annular flange secured to the barrel at said cut-out and to one edge portion of each of the side plates.

2. The method of producing a body for a valve of the diaphragm type which comprises forming a hollow barrel having a cut-out in one side between its ends and extending equally into both adjacent sides, forming from sheet material by distorting the material from its plane about but a single axis (1) a pair of side plates, (2) a curved weir seat plate, and (3) a pair of shovel plates of generally triangular form, and assembling the barrel and said other parts with three annular flanges so that (a) two of the annular flanges are secured to the ends of the barrel in alignment with its end openings, (b) the third annular flange is attached to the barrel at the cut-out, with its plane generally parallel to the axis of the barrel, (c) the side plates are secured to the barrel on opposite sides thereof along the edge of the cut-out and to the third annular flange, (d) the weir seat plate extends across the barrel at substantially the center of the third annular flange with its concave side up and is connected at its ends to the third annular flange, and (e) the shovel plates are connected along their bases to opposite sides of the weir seat plate and extend downwardly therefrom and towards the opposite ends of the barrel, with the side edges thereof connected to the inner faces of the side plates and the inner surface of the barrel.

3. The method of producing a body for a valve of the diaphragm type which comprises forming a hollow barrel having a cut-out in one side between its ends and extending equally into both adjacent sides, forming from sheet material by distorting the material from its plane about but a single axis (1) a pair of side plates, (2) a curved weir seat plate, and (3) a pair of shovel plates of generally triangular form, and assembling the barrel and said other parts with three annular flanges so that (a) two of the annular flanges are secured to the ends of the barrel in alignment with its end openings, (b) the third annular flange is attached to the barrel at the cut-out, with its plane generally parallel to the axis of the barrel, (c) the side plates are secured to the barrel on opposite sides thereof along the edge of the cut-out and to the inner edge of the third annular flange on opposite sides of under cut portions thereof, (d) the weir seat plate extends across the barrel at substantially the center of the third annular flange with its concave side up and is connected at its ends to the third annular flange, and (e) the shovel plates are connected along their bases to opposite sides of the weir seat plate and extend downwardly therefrom and towards the opposite ends of the barrel, with the side edges thereof connected to the inner faces of the side plates and the inner surface of the barrel.

4. The method of producing a body for a valve of the diaphragm type which comprises forming from a length of tubing a hollow barrel having a cut-out at one side between its ends and extending into both adjacent sides, forming from sheet material by distorting the material from its plane about but a single axis (1) a pair of side plates (2) a curved weir seat plate, and (3) a pair of shovel plates of generally triangular form, and assembling the barrel and said other parts with three annular flanges and welding them together to form a unitary diaphragm valve structure with one of the annular flanges secured to each end of the barrel and the third annular flange secured to the barrel at said cut-out and to one edge portion of each side plate.

5. The method of producing a body for a valve of the diaphragm type which comprises forming from a length of tubing a hollow barrel having a cut-out at one side between its ends and extending into both adjacent sides, forming from sheet material by distorting the material from its plane about but a single axis (1) a pair of side plates (2) a curved weir seat plate, and (3) a pair of shovel plates of generally triangular form, and assembling the barrel and said other parts with three annular flanges and welding them together so that (a) two of the annular flanges are secured to the ends of the barrel in alignment with its end openings, (b) the third annular flange is attached to the barrel at the cut-out with its plane generally parallel to the axis of the barrel (c) the side plates are secured to the barrel on opposite sides thereof along the edge of the cut-out and to the third annular flange in under-cut portions in its inner edge in alignment with the axis of the barrel, (d) the weir seat plate extends across the barrel with its concave side up and is connected at its ends to the third annular flange, and (e) the shovel plates are connected along their bases to opposite sides of the weir seat plate and extend downwardly therefrom towards and substantially to the opposite ends of the barrel, with the side edges thereof connected to the inner faces of the side plates and the inner surface of the barrel.

HENRY W. BOTELER.

REFERENCES CITED

The following references are of record in the file of this patent:

UNITED STATES PATENTS

| Number | Name | Date |
|---|---|---|
| 2,034,418 | Plant | Mar. 17, 1936 |
| 2,122,957 | Santamaria | July 5, 1938 |
| 2,363,943 | Carlson | Nov. 28, 1944 |
| 1,800,157 | Saunders | Apr. 7, 1931 |
| 2,186,833 | Iler | Jan. 9, 1940 |
| 2,191,863 | Saunders | Feb. 27, 1940 |
| 1,935,329 | Needham | Nov. 14, 1933 |
| 2,227,542 | Grove | Jan. 7, 1941 |

FOREIGN PATENTS

| Number | Country | Date |
|---|---|---|
| 489,602 | Great Britain | 1938 |